(12) United States Patent
Hamon et al.

(10) Patent No.: US 11,407,072 B2
(45) Date of Patent: Aug. 9, 2022

(54) CLAMP FOR RETAINING A BLOCK OF MATERIAL ON A MACHINING TABLE, CLAMPING DEVICE COMPRISING SAID CLAMP AND METHOD OF CLAMPING A BLOCK OF MATERIAL, ONTO A MACHINING TABLE

(71) Applicant: Airbus Operations SAS, Toulouse (FR)

(72) Inventors: Arnaud Hamon, Toulouse (FR);
Vincent Lhopital, Toulouse (FR);
Anthony Loyer, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 90 days.

(21) Appl. No.: 17/011,348

(22) Filed: Sep. 3, 2020

(65) Prior Publication Data
US 2021/0069841 A1    Mar. 11, 2021

(30) Foreign Application Priority Data
Sep. 9, 2019   (FR) ........................................ 1909889

(51) Int. Cl.
*B23Q 3/10*    (2006.01)
(52) U.S. Cl.
CPC ............. *B23Q 3/102* (2013.01); *B23Q 3/103* (2013.01)
(58) Field of Classification Search
CPC .......... B23Q 1/42; B23Q 3/066; B23Q 3/069; B23Q 3/102; B23Q 3/103; B23Q 3/105–107
See application file for complete search history.

(56) References Cited

U.S. PATENT DOCUMENTS

| | | | | |
|---|---|---|---|---|
| 4,198,038 A | * | 4/1980 | Quinter | ..................... B23Q 3/06 269/282 |
| 4,772,000 A | * | 9/1988 | Aubert | ..................... B25B 5/06 269/254 CS |
| 2014/0363252 A1 | | 12/2014 | Wawro | |

FOREIGN PATENT DOCUMENTS

| CN | 103480861 B | 1/2016 |
|---|---|---|
| EP | 1442833 A1 | 8/2004 |

OTHER PUBLICATIONS

French Search Report; priority document.

\* cited by examiner

*Primary Examiner* — Tyrone V Hall, Jr.
(74) *Attorney, Agent, or Firm* — Greer, Burns & Crain, Ltd.

(57) ABSTRACT

A clamp to retain a block of material on a machining table including a body having a first face, a first front face oriented toward the machining table and the block of material when in use, a nose projecting relative to the first front face having a second front face parallel to the first front face, first and second edges connecting the first and second front faces, and at least one internally threaded hole opening at least partly at the level of the second front face with an axis forming a non-zero angle with the first face and the second front face, at least one grub screw screwed into the internally threaded hole having a pointed free end configured to penetrate into the block of material when in use when screwing in the grub screw, and a connecting system to demountably connect the clamp to the machining table.

10 Claims, 5 Drawing Sheets

CLAMP FOR RETAINING A BLOCK OF MATERIAL ON A MACHINING TABLE, CLAMPING DEVICE COMPRISING SAID CLAMP AND METHOD OF CLAMPING A BLOCK OF MATERIAL, ONTO A MACHINING TABLE

CROSS-REFERENCES TO RELATED APPLICATIONS

This application claims the benefit of the French patent application No. 1909889 filed on Sep. 9, 2019, the entire disclosures of which are incorporated herein by way of reference.

FIELD OF THE INVENTION

The present application relates to a clamp for retaining a block of material on a machining table, to a clamping device comprising the clamp as well as to a method of clamping a block of material onto a machining table.

BACKGROUND OF THE INVENTION

In one known method of manufacture as illustrated in FIGS. 1 and 2, a part is produced by machining a block 10 of material, for example of aluminum alloy, fixed to a machining table 12. In one configuration the block 10 of material has a bearing surface 10.1 pressed against a bearing surface 12.1 of the machining table and at least one lateral surface 10.2 approximately perpendicular to the bearing surface 12.1 of the machining table 12.

A clamping device is used to hold the block 10 of material immobile on the machining table 12. In accordance with one embodiment that can be seen in FIGS. 1 and 2, the clamping device comprises at least one groove 14 on the lateral surface 10.2 of the block 10 of material as well as at least one clamp 16 fastened in a demountable manner to the machining table 12 and configured to cooperate with the groove 14 in the block 10 of material.

Each clamp 16 comprises an approximately parallelepipedal body 18 that has a first face 18.1 oriented toward the machining table 12, a second face 18.2 opposite the first face 18.1, a third, so-called front face 18.3 oriented toward the block 10 of material when in use as well as a fourth face 18.4 opposite the front face 18.3. The clamp 16 comprises a heel piece 20 projecting relative to the first face 18.1, positioned in line with the fourth face 18.4 and configured to be in contact against the bearing surface 12.1 of the machining table 12 when in use, as well as a nose 22 projecting relative to the front face 18.3, positioned in line with the second face 18.2 and sized to be housed in the groove 14 in the block 10 of material when in use.

Each clamp 16 also comprises a connecting system 24 for connecting it in a demountable manner to the machining table 12. To this end, the latter comprises a plurality of T-shaped grooves 26 opening at the level of the bearing surface 12.1. In accordance with one embodiment a connecting system 24 comprises an oblong hole 28 through the body 18 of the clamp 16 and opening at the level of the first and second faces 18.1, 18.2, a screw 30 having a head 30.1 pressing against the body 18 of the clamp 16 and a threaded shank 30.2 housed in the oblong hole 28, as well as a gib 32 configured to be housed in one of the T-shaped grooves 26 of the machining table 12 and into which the threaded shank 30.2 of the screw 30 is screwed when in use.

To hold it immobile on the machining table 12, the block 10 of material is positioned on the latter and the clamps 16 are positioned so that the nose 22 of each of them is housed in one of the grooves 14 in the block 10 of material. Following this, the screw 30 is screwed in so that the nose 22 of each clamp 16 exerts a pressing force on the block 10 of material in the direction of the machining table 12.

This type of clamp enables perfect immobilization of the block 10 of material on the machining table 12 whatever the orientation of the latter, vertical or horizontal.

However, it requires the presence of at least two grooves 14 on the block of material, which increases its price.

The document US2014/0363252 describes clamps for retaining a block of material on a machining table. That clamp is substantially parallelepipedal and comprises an internally threaded, approximately horizontal through-hole configured to house a grub screw. This embodiment does not enable effective retention of the block of material on the machining table.

SUMMARY OF THE INVENTION

The present invention aims to remedy all or some of the disadvantages of the prior art.

To this end, the invention comprises a clamp for retaining a block of material on a machining table, the clamp comprising a body having a first face and at least one first front face respectively oriented toward the machining table and the block of material when in use, as well as a connecting system for connecting the clamp in a demountable manner to the machining table.

According to the invention, the body of the clamp comprises a nose projecting relative to the first front face having a second front face parallel to the first front face as well as first and second edges connecting the first and second front faces, the nose being sized to be housed in a groove in a block of material when in use, in that the body comprises at least one internally threaded hole opening at least partly at the level of the second front face and having an axis forming a non-zero angle with the first face and the second front face and in that the clamp comprises at least one grub screw that screws into the internally threaded hole having a pointed free end configured to penetrate into the block of material when in use when screwing in the grub screw.

Due to this flange, it is therefore possible to retain on the machining table a block of material with no grooves on its lateral surfaces.

In accordance with another feature, the axis of the internally threaded hole forms with the second front face an angle between 30 and 60° inclusive.

In accordance with another feature, the body comprises at least one insert including the internally threaded hole.

In accordance with another feature, the connecting system comprises a gib configured to be inserted in a T-shaped groove of the machining table when in use, at least one through-hole at the level of the body of the clamp as well as at least one screw, one for each through-hole, including a threaded shank configured to be housed in the through-hole and to be screwed into the gib, each through-hole having a diameter slightly greater than that of the threaded shank of the screw.

In accordance with another feature, the internally threaded hole opens at the level of the second front face and of the first edge closest to the first face.

In accordance with another feature, the axis of the internally threaded hole intersects an edge connecting the second front face and the first edge.

In accordance with another feature, the clamp comprises a shim connected in a removable manner to the body, positioned on the first face and projecting relative to the first face.

The invention also comprises a clamping device comprising at least one clamp having any one of the above features.

The invention also comprises a method of clamping a block of material onto a machining table, characterized in that the clamping method comprises a step of moving clamps having any one of the above features on the machining table until the nose of each clamp is in contact with the block of material, the grub screw of each clamp not projecting relative to the second front face, a step of tightening at least one screw of the connecting system of each clamp to a first clamping torque to immobilize each clamp relative to the machining table, followed by a step of screwing the grub screw of each clamp to a second clamping torque in order for the pointed free end of the grub screw to penetrate into the material of the block of material.

In accordance with another feature, the second clamping torque is less than the first clamping torque.

The invention also comprises a method of machining a block of material comprising two bearing surfaces and at least one lateral surface, characterized in that the machining method comprises a first machining phase during which the first bearing surface of the block of material is held pressed against the machining table due to clamps (according to the invention), using the clamping method (having any one of the above features), and a groove is then produced on one of the lateral surfaces of the block of material, as well as a second machining phase during which the second bearing surface of the block of material is held pressed against the machining table due to the clamps, the grub screw of each clamp not projecting relative to the second front surface and the nose of each clamp being housed in the groove.

BRIEF DESCRIPTION OF THE DRAWINGS

Other features and advantages will emerge from the following description of the invention given by way of example only and with reference to the appended drawings, in which.

DETAILED DESCRIPTION OF THE PREFERRED EMBODIMENTS

Figure 7:
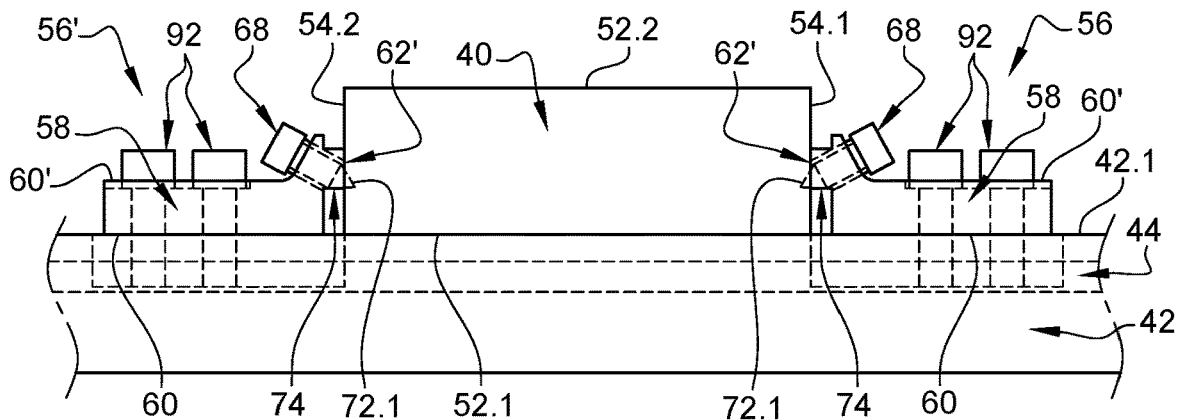
FIG. 7 is a lateral view of a clamping device that illustrates one embodiment of the invention in a horizontal configuration.
Figure 10:
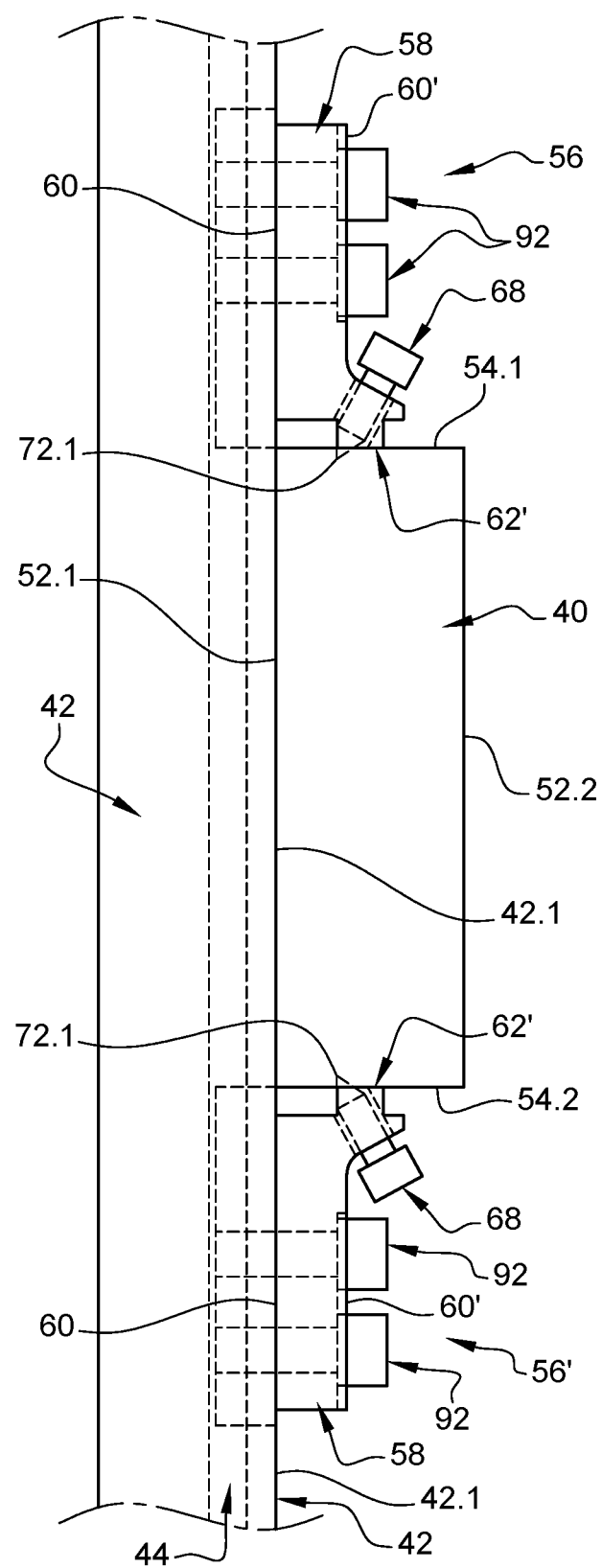
FIG. 10 is a side view of a clamping device that illustrates one embodiment of the invention in a vertical configuration.

In FIGS. 7 and 10, a clamping device has been represented which makes it possible to hold a block 40 of material immobile on a machining table 42.

In accordance with one configuration, the machining table 42 has a plane bearing surface 42.1 intended to receive the block 40 of material and a plurality of T-shaped grooves 44 opening at the level of the bearing surface 42.1. The machining table 42 may be oriented horizontally, as shown in FIG. 7, or vertically, as shown in FIG. 10.

In accordance with one application, the machining table 42 is integrated into a machine tool, such as a machining center, for example, that comprises, in addition to the machining table, at least one machining head 46 (which can be seen in FIG. 8) equipped with a tool 48, such as, for example, a milling tool, configured to produce a groove 50 in the block 40 of material.

The machining table 42 is not described further because it is known to the person skilled in the art. Moreover, it is not limited to the embodiments that can be seen in FIGS. 7 to 10.

Figure 8:
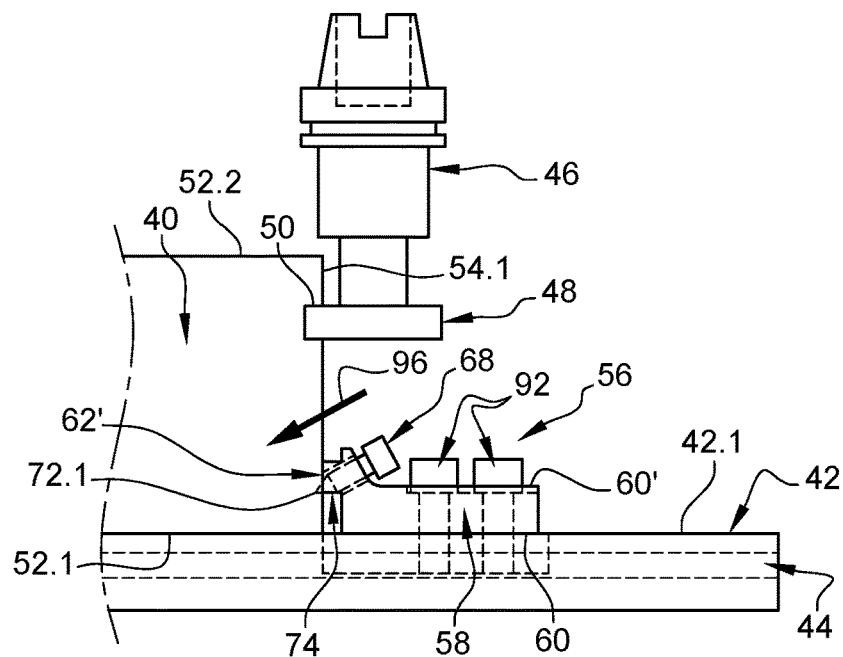
FIG. 8 is a side view of a part of the clamping device that can be seen in FIG. 7 during a first machining phase.
Figure 9:
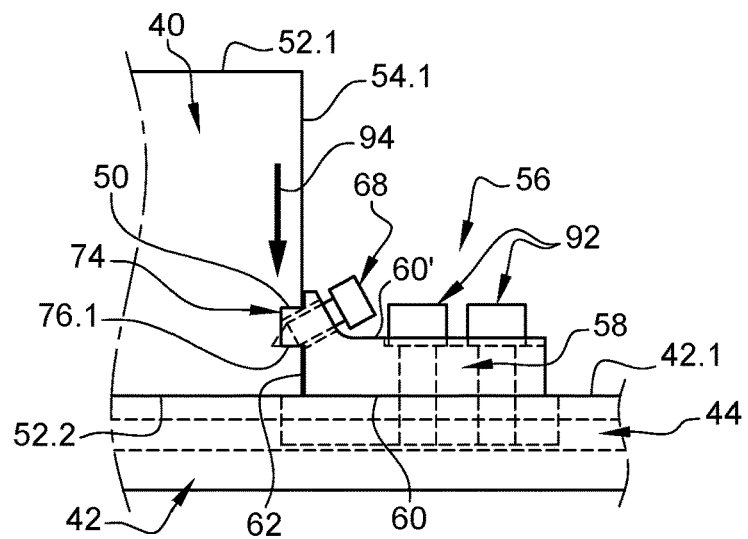
FIG. 9 is a side view of a part of the clamping device that can be seen in FIG. 7 during a second machining phase.

In accordance with one embodiment, the block 40 of material is made of metal, for example of aluminum alloy, and has an approximately parallelepipedal shape. It has a first bearing surface 52.1 intended to bear against the bearing surface 42.1 of the machining table 42 during a first machining phase, as shown in FIGS. 7 and 8, a second bearing surface 52.2 approximately parallel to the first bearing surface 52.1 intended to bear against the bearing surface 42.1 of the machining table 42 during a second machining phase, as shown in FIG. 9, as well as first and second parallel lateral surfaces 54.1, 54.2 approximately perpendicular to the bearing surface 42.1 when in use. In accordance with one particular feature of the invention, the first and second lateral surfaces 54.1, 54.2 may be free of grooves.

Of course, the invention is not limited to this embodiment of the block 40 of material. At the very least, the latter comprises at least one bearing surface 52.1 and at least one lateral surface 54.1.

The clamping device comprises at least one clamp 56 fastened in a demountable manner to the machining table 42 and configured to cooperate with the block 40 of material when in use in such a manner as to hold it immobile against the bearing surface 42.1 of the machining table 42.

The clamping device generally comprises a plurality of clamps 56 distributed along the first and second lateral surfaces 54.1, 54.2. In accordance with one configuration the clamping device comprises at least one first clamp 56 cooperating, when in use, with the first lateral surface 54.1 of the block 40 of material and at least one second clamp 56' cooperating when in use with the second lateral surface 54.2.

In accordance with one embodiment, the clamp 56 comprises a body 58 that has a first face 60 oriented toward the machining table 42 when in use, at least one front face 62, 62' oriented toward the block 40 of material when in use, as well as at least one internally threaded hole 64 opening at least partly at the level of the front face 62, 62'. The first face 60 and the front face 62, 62' are substantially plane. The first face 60 and the front face 62, 62' form between them an angle complementary to the angle formed by the first bearing surface 52.1 and one of the first and second lateral surfaces 54.1, 54.2 of the block 40 of material. When the lateral surfaces 54.1, 54.2 of the block 40 of material are perpendicular to the first bearing surface 52.1 the first face 60 and the front face 62, 62' are perpendicular.

The first face 60 and the front face 62, 62' extend between first and second lateral faces 66.1, 66.2 approximately parallel to one another and approximately perpendicular to the first face 60 and to the front face 62, 62'.

In the remainder of the description a longitudinal direction is perpendicular to the front face 62, 62'. A longitudinal plane is a plane perpendicular to the first face 60 and the front face 62, 62'. A median longitudinal plane is equidistant from the first and second lateral faces 66.1, 66.2.

When in use, the first face 60 and the front face 62, 62' may be pressed against the bearing surface 42.1 of the machining table 42 and one of the lateral surfaces 54.1, 54.2 of the block 40 of material, respectively.

In accordance with one configuration, each internally threaded hole 64 has an axis A64 positioned in a median longitudinal plane and forming a non-zero angle with the first face 60 and the front face 62, 62'. The axis A64 forms with the front face 62, 62' an angle between 30 and 60° inclusive.

In addition to the body 58, the clamp 56 comprises at least one grub screw 68 screwed into the internally threaded hole 64 when in use. Each grub screw 68 has a head 70 for screwing it in and out as well as a threaded shank 72 configured to be screwed into the internally threaded hole 64, including a pointed free end 72.1 configured to penetrate into the block 40 of material when in use when screwing in the grub screw 68.

The grub screw 68 is made of a material harder than the block 40 of material to enable its pointed free end 72.1 to penetrate into the block 40 of material. When in use, the grub screw 68 is configured to occupy a retracted position in which it does not project relative to the front face 62, 62' and a deployed position in which the pointed free end 72.1 of the grub screw 68 projects relative to the front face 62, 62'.

Figure 6:
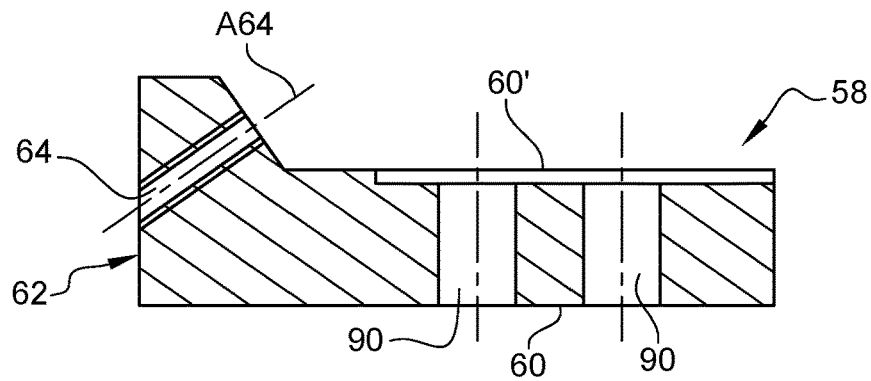
FIG. 6 is a longitudinal section of a clamp body that illustrates another embodiment.

In accordance with an embodiment that can be seen in FIG. 6, the front face 62 is plane and the body 58 of the clamp does not comprise a nose.

In accordance with an embodiment of the invention that can be seen in FIGS. 3 to 5 and 7 to 10, the body 58 comprises a nose 74. In accordance with this embodiment the body 58 comprises a first front face 62 and a rib projecting relative to the first front face 62 and forming the nose 74, having a second front face 62' parallel to the first front face 62 as well as first and second edges 76.1, 76.2 connecting the first and second front faces 62, 62', approximately parallel to the first face 60 of the body 58 of the clamp 56.

The nose 74, in particular its second front face 62' as well as its first and second edges 76.1, 76.2, is sized to be housed in the groove 50 in the block 40 of material during a second machining phase and to enable effective pressing of the block 40 of material against the machining table 42 when the first edge 76.1 of the nose 74, that closest to the first face 60, is in contact with the block 40 of material.

In accordance with one embodiment, the nose 74 extends from the first lateral face 66.1 to the second lateral face 66.2.

In accordance with one configuration, the internally threaded hole 64 opens at the level of the second front face 62' and of the first edge 76.1. The axis A64 of the internally threaded hole 64 intersects an edge 78 connecting the second front face 62' and the first edge 76.1.

Figure 5:
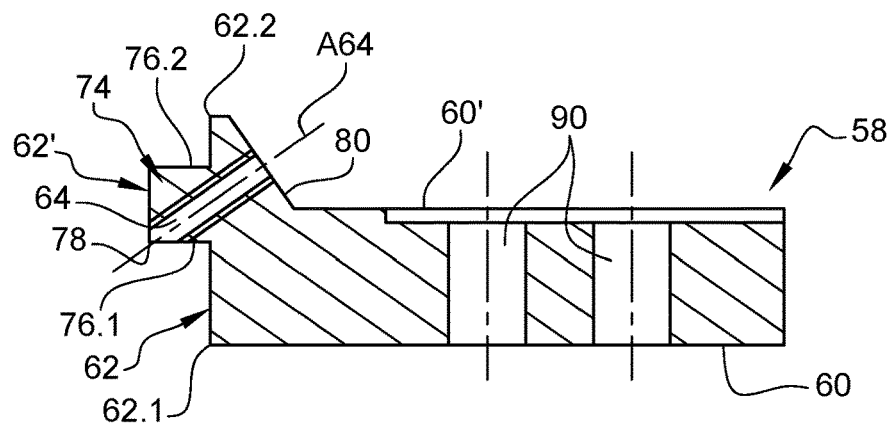
FIG. 5 is a longitudinal section of a clamp body that illustrates one embodiment of the invention.

In accordance with an embodiment that can be seen in FIG. 5, the body 58 of the clamp 56 comprises a second face 60' parallel to the first face 60. The first front face 62 extends from a first edge 62.1 in line with the first face 60 to a second edge 62.2 offset relative to the second face 60', connected to the latter by a surface that has an inclined flat 80 approximately perpendicular to the axis A64 of the internally threaded hole 64. The nose 74 is at a distance from the first and second edges 62.1, 62.2.

Figure 1:
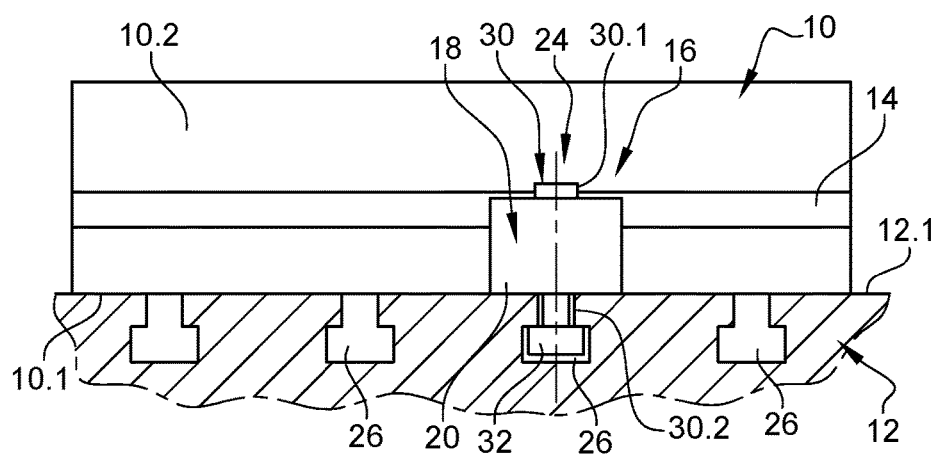
FIG. 1 is a front view of a clamping device illustrating one embodiment of the prior art.
Figure 2:
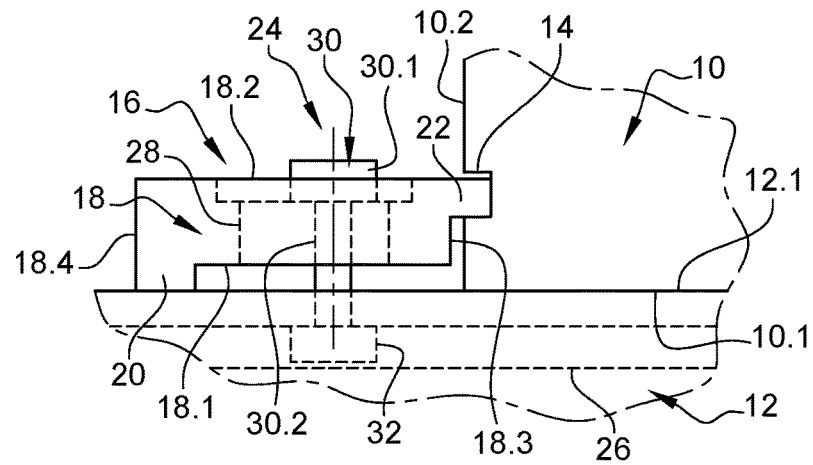
FIG. 2 is a side view of the clamping device illustrating one embodiment of the prior art.
Figure 3:
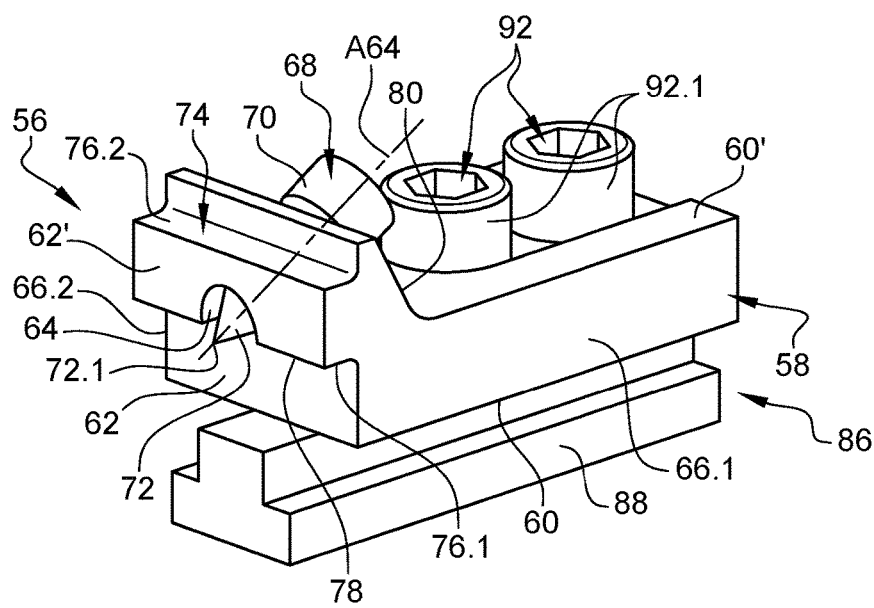
FIG. 3 is a perspective view of a clamp illustrating one embodiment of the invention.
Figure 4:
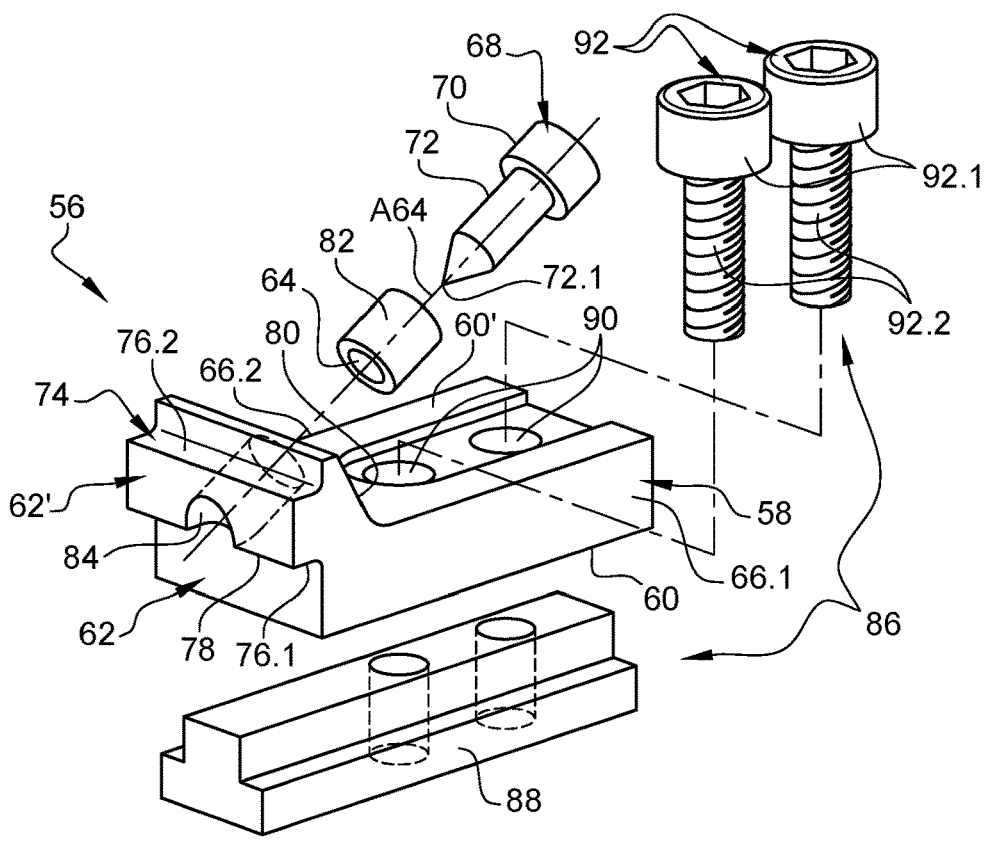
FIG. 4 is an exploded perspective view of the clamp that can be seen in FIG. 3.

In accordance with an embodiment that can be seen in FIG. 4, the body 58 comprises at least one insert 82 including the internally threaded hole 64 and inserted in a smooth hole 84 in the body 58. Accordingly, if the threads of the internally threaded hole 64 are worn, only the insert 82 is replaced and not the whole of the body 58.

Each clamp 56 also comprises a connecting system 86 for connecting it in a demountable manner to the machining table 42.

In accordance with one embodiment, the connecting system 86 comprises a gib 88 configured to be inserted into a T-shaped groove 44 in the machining table 42, at least one through-hole 90 at the level of the body 58 of the clamp 56, opening at the level of the first and second faces 60, 60' of the body 58, as well as at least one screw 92, one for each through-hole 90, which has a head 92.1, configured to bear against the second face 60' of the body 58, and a externally threaded shank 92.2 configured to be housed in the through-hole 90 and to be screwed into the gib 88. In accordance with one configuration the connecting system 86 comprises two through-holes 90 positioned in the median longitudinal plane.

In accordance with one embodiment, each passage-hole 90 has a diameter slightly greater than that of the externally threaded shank 92.2 of the screw 92 to enable slight inclination of the body 58 of the clamp 56 when the nose 74 is used to retain the block 40 of material.

In accordance with one embodiment, the body 58 and the gib 88 of the clamp 56 are made of treated steel. For example, the screws 92 are M12 screws and the grub screw 68 is an M10 screw.

Figure 11:
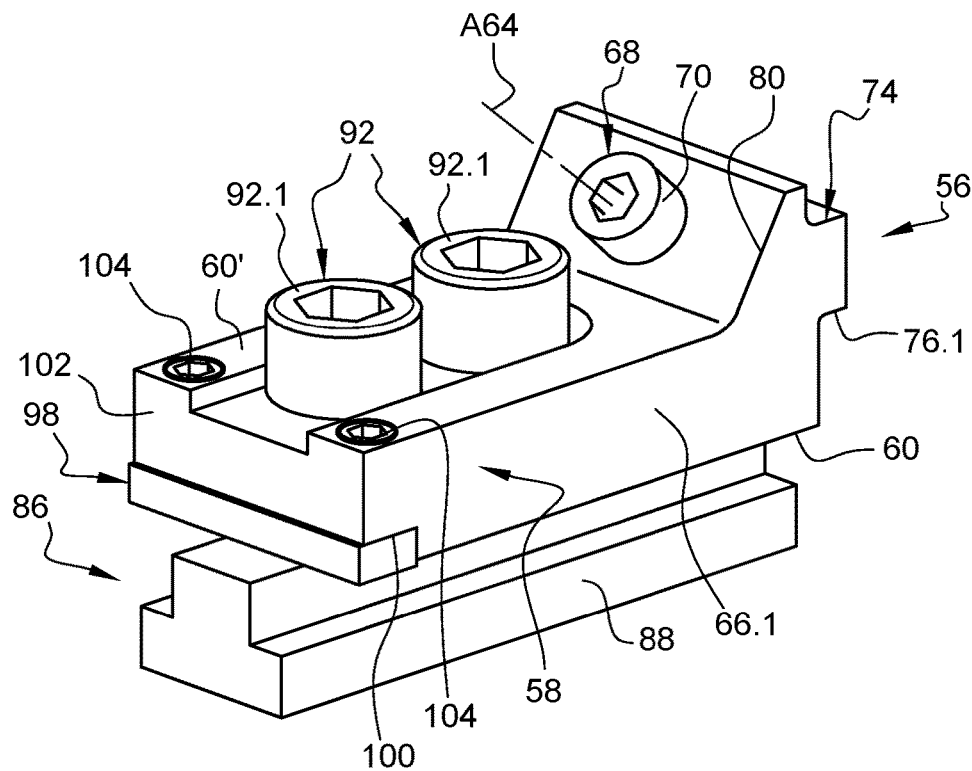
FIG. 11 is a perspective view of a clamp illustrating another embodiment of the invention.
Figure 12:
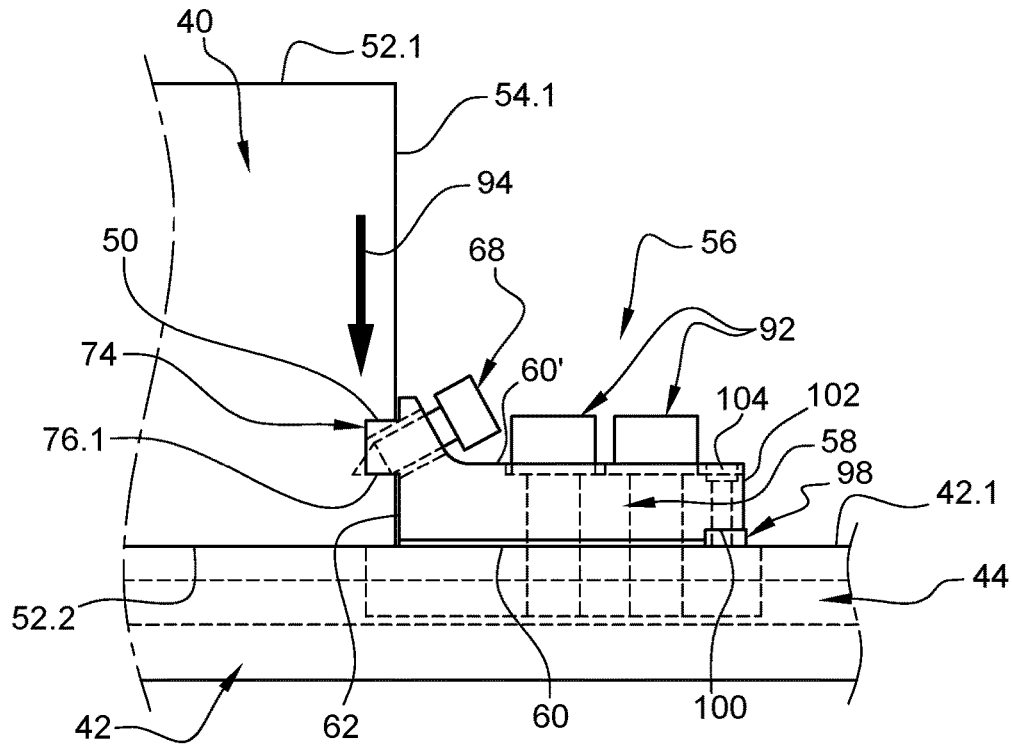
FIG. 12 is a side view of the clamp that can be seen in FIG. 11.

In accordance with an embodiment that can be seen in FIGS. 11 and 12 the clamp 56 comprises a shim 98 connected in a demountable manner to the body 58, positioned on the first face 60, projecting relative to the first face 60 so that this first face 60 is slightly spaced from the bearing surface 42.1 of the machining table 42 when in use.

In accordance with one configuration, the body 58 comprises a housing 100 configured to house the shim 98 positioned at the intersection of the first face 60 and the rear face 102 of the body 58. This housing 100 extends the full width of the body 58. Additionally, the shim 98 has a rectangular section and extends the whole width of the body 58. The shim 98 and the housing 100 are sized so that the shim 98 projects slightly, by on the order of one millimeter, relative to the first face 60 of the body.

The shim 98 is connected to the body 58 by demountable connecting elements 104, such as screws, for example.

The shim 98 is made from a material less hard than the machining table 42 to limit the risks of damaging that machining table 42. The shim 98 is demountable so as to be able to change it when it is worn without changing the whole of the clamp 56.

The use of the clamp 56 is described with reference to FIGS. 7 to 9.

Initially the block 40 of material, without the groove, is placed on the machining table 42. The clamps 56 are distributed on either side of the block 40 of material, the gib 88 of each of them being introduced into the T-shaped groove 44 in the machining table 42.

The clamping method comprises a step of moving the clamps 56 on the machining table 42 until the second front face 62' of each clamp 56 is in contact with the block 40 of material, the grub screws 68 being in the retracted position, a step of tightening at least one screw 92 of the connecting system 86 of each clamp 56 to a first clamping torque, for example of the order of 80 N.m, to immobilize each clamp 56 relative to the machining table 42, followed by a step of screwing in the grub screws 68 to a second clamping torque, less than the first clamping torque, of the order of 30 N.m, in order for the pointed free end 72.1 of each grub screw 68 to penetrate into the block 40 of material.

Accordingly, as shown in FIG. 7, the block 40 of material is held immobile by the various clamps 56. The clamping device of the invention can equally well hold a block 40 of material immobile on a horizontal machining table, as shown in FIG. 7, or on a vertical machining table 42, as shown in FIG. 10.

In accordance with one embodiment, the method of machining the block 40 of material comprises a first machining phase during which the first bearing surface 52.1 of the block 40 of material is held pressed against the machining table 42 by the clamps 56, as described above, and a groove 50 produced on one of the lateral surfaces 54.1, 54.2 of the block 40 of material, using a standard tool, as shown in FIG. 8. In accordance with one mode of operation, a groove 50 is produced on each of the lateral surfaces 54.1 and 54.2 of the block of material. Other machining operations may be carried out on the second bearing surface 52.2.

At the end of the first machining phase, the grub screws 68 and the screws 92 of the clamps 56 are unscrewed. The block 40 of material can then be turned over in such a manner as to press its second bearing surface 52.2 against the machining table 42. The grub screw 68 of each clamp 56 being in the retracted position, the clamps 56 are moved until the nose 74 of each of them is introduced into one of the grooves 50 in the block 40 of material. It then suffices to screw in the screws 92 of each clamp 56 to hold it immobilized on the block 40 of material on the machining table 42 and to start a second machining phase. To produce a pressing force, the distance between the groove 50 and the second bearing surface 52.2 must be greater than the distance separating the nose 74 and the first face 60 of the body 58 of the clamp 56.

Accordingly, the same clamp 56 that can be seen in FIGS. 3 to 5 and 7 to 10 enables clamping of the block 40 of material using either the grub screw 68 or the nose 74. Clamping the block 40 of material using the nose 74 makes it possible to limit the risks of deformation of the block 40 of material, the pressing force 94 exerted by the clamp 56 on the block 40 of material being oriented only in a direction perpendicular to the bearing surface 42.1 of the machining table 42 whereas clamping the block 40 of material using the grub screw 68 generates a pressing force 96 with a component perpendicular to the bearing surface 42.1 of the machining table 42 and a component parallel to the bearing surface 42.1 of the machining table 42 that may tend to deform the block 40 of material as a function of its geometry.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A clamp for retaining a block of material on a machining table, the clamp comprising:
   a body having a first face and at least one first front face respectively oriented toward the machining table and the block of material when in use, as well as a connecting system for connecting the clamp in a demountable manner to the machining table,
   the body of the clamp comprising:
      a nose projecting relative to the first front face having a second front face parallel to the first front face, as well as first and second edges connecting the first and second front faces, said nose being sized to be housed in a groove in a block of material when in use,
      at least one internally threaded hole opening at least partly at a level of the second front face and having an axis forming a non-zero angle with the first face and the second front face, and
   the clamp comprising:
      at least one grub screw that screws into the internally threaded hole having a pointed free end configured to penetrate into the block of material when in use when screwing in the grub screw,
   wherein the clamp comprises a shim connected in a removable manner to the body, positioned on the first face and projecting relative to said first face.

2. The clamp as claimed in claim 1, wherein the axis of the internally threaded hole forms with the second front face an angle between 30 and 60° inclusive.

3. The clamp as claimed in claim 1, wherein the body comprises at least one insert including the internally threaded hole.

4. The clamp as claimed in claim 1, wherein the connecting system comprises:
   a gib configured to be inserted in a T-shaped groove of the machining table when in use,
   at least one through-hole at a level of the body of the clamp, and
   at least one screw, one screw for each through-hole, including a threaded shank configured to be housed in the through-hole and to be screwed into the gib,
   each through-hole having a diameter slightly greater than that of the threaded shank of the screw.

5. The clamp as claimed in claim 1, wherein the internally threaded hole opens at a level of the second front face and of the first edge closest to the first face.

6. The clamp as claimed in claim 5, wherein the axis of the internally threaded hole intersects an edge connecting the second front face and the first edge.

7. A clamping device comprising at least one clamp as claimed in claim 1.

8. A method of clamping a block of material onto a machining table, comprising:
   moving at least one clamp as claimed in claim 1 on the machining table until the nose of each clamp is in contact with the block of material, the grub screw of each clamp not projecting relative to the second front face,
   tightening at least one screw of the connecting system of each clamp to a first clamping torque to immobilize each clamp relative to the machining table, followed by screwing the grub screw of each clamp to a second clamping torque in order for the pointed free end of the grub screw to penetrate into the material of the block of material.

9. The clamping method as claimed in claim 8, wherein the second clamping torque is less than the first clamping torque.

10. A method of machining a block of material comprising two bearing surfaces and at least one lateral surface, comprising a first machining phase comprising:
  holding a first bearing surface of the block of material pressed against the machining table utilizing at least one clamp according to claim 1, wherein the internally threaded hole opens at a level of the second front face and of the first edge closest to the first face,
  moving the at least one clamp on the machining table until the nose of each clamp is in contact with the block of material, the grub screw of each clamp not projecting relative to the second front face,
  tightening at least one screw of the connecting system of each clamp to a first clamping torque to immobilize each clamp relative to the machining table, followed by
  screwing the grub screw of each clamp to a second clamping torque in order for the pointed free end of the grub screw to penetrate into the material of the block of material, and
  producing a groove on one of the lateral surfaces of the block of material, and a second machining phase comprising:
  holding a second bearing surface of the block of material pressed against the machining table due to the at least one clamp, the grub screw of each clamp not projecting relative to the second front surface and the nose of each clamp being housed in the groove.

\* \* \* \* \*